United States Patent
Dauber et al.

(10) Patent No.: US 11,586,422 B2
(45) Date of Patent: Feb. 21, 2023

(54) AUTOMATED SYSTEM CAPACITY OPTIMIZATION

(71) Applicant: INTERNATIONAL BUSINESS MACHINES CORPORATION, Armonk, NY (US)

(72) Inventors: Melanie Dauber, Oceanside, NY (US); Dana L. Price, Surf City, NC (US)

(73) Assignee: International Business Machines Corporation, Armonk, NY (US)

( * ) Notice: Subject to any disclaimer, the term of this patent is extended or adjusted under 35 U.S.C. 154(b) by 161 days.

(21) Appl. No.: 17/302,554

(22) Filed: May 6, 2021

(65) Prior Publication Data

US 2022/0357928 A1 Nov. 10, 2022

(51) Int. Cl.
*G06F 9/44* (2018.01)
*G06F 8/10* (2018.01)
*G06F 9/50* (2006.01)
*G06F 8/41* (2018.01)
*G06F 8/77* (2018.01)

(52) U.S. Cl.
CPC .............. *G06F 8/10* (2013.01); *G06F 8/43* (2013.01); *G06F 8/77* (2013.01); *G06F 9/5055* (2013.01)

(58) Field of Classification Search
CPC ..... G06F 8/10; G06F 8/43; G06F 8/77; G06F 9/5055
USPC ........................................................ 717/120
See application file for complete search history.

(56) References Cited

U.S. PATENT DOCUMENTS

| | | | |
|---|---|---|---|
| 8,434,088 B2 | 4/2013 | Banerjee | |
| 8,458,334 B2 | 6/2013 | Sukthankar | |
| 9,639,402 B2 | 5/2017 | Dochez | |
| 9,654,323 B2* | 5/2017 | Agee | H04W 28/06 |
| 9,813,318 B2 | 11/2017 | Iyoob | |
| 9,818,127 B2 | 11/2017 | Iyoob | |

(Continued)

FOREIGN PATENT DOCUMENTS

| | | |
|---|---|---|
| CN | 106844175 A | 6/2017 |
| WO | 2020263374 A1 | 12/2020 |

OTHER PUBLICATIONS

Kitchenham et al., "Software metrics and integrated project support environments", 1986, Software Engineering Journal, pp. 58-64. (Year: 1986).*

(Continued)

*Primary Examiner* — Ted T. Vo
(74) *Attorney, Agent, or Firm* — Schmeiser, Olsen & Watts, LLP; Aaron Pontikos (57) ABSTRACT

A method, system, and computer program product for implementing automated system capacity optimization is provided. The method includes retrieving from plug-in components running on a plurality of hardware and software sources, metrics data associated with the plug-in components. The metrics data is cross-referenced with respect to operational sizing recommendations for each plug-in component based on aggregated disparate sizing guidelines and resulting software code modules are generated. Software and hardware requirements for enabling target computing components are determined based on results of executing the software code modules and operational functionality of the target computing components are enabled in accordance with the software and hardware requirements.

20 Claims, 6 Drawing Sheets

(56) References Cited

U.S. PATENT DOCUMENTS

| | | | |
|---|---|---|---|
| 10,285,089 B2 * | 5/2019 | Fehske | H04W 16/18 |
| 10,365,944 B2 | 7/2019 | Feng | |
| 10,545,525 B2 * | 1/2020 | Kamel | G01R 21/133 |
| 10,585,693 B2 | 3/2020 | Aydelott | |
| 10,620,839 B2 * | 4/2020 | Alatorre | G06F 3/0641 |
| 10,880,189 B2 * | 12/2020 | Martinez | H04L 67/10 |
| 11,316,581 B2 * | 4/2022 | Vos | H04B 7/18506 |
| 2008/0228459 A1 | 9/2008 | Jiang | |
| 2018/0352020 A1 | 12/2018 | Bauer | |
| 2020/0412663 A1 | 12/2020 | Bryc | |

OTHER PUBLICATIONS

Fabini et al., "M2M Communication Delay Challenges: Application and Measurement Perspectives", 2015, IEEE, pp. 1-6. (Year: 2015).*

Ramachandran et al., "Capacity Optimization based on Traffic Grooming in Transport Networks", 2019, IEEE, pp. 435-441. (Year: 2019).*

Mell, Peter et al.; "The NIST Definition of Cloud Computing;" National Institute of Standards and Technology; Special Publication 800-145; Sep. 2011; 7 pages.

* cited by examiner

AUTOMATED SYSTEM CAPACITY OPTIMIZATION

BACKGROUND

The present invention relates generally to a method for automating system capacity optimization and in particular to a method and associated system for improving software technology associated with cross-referencing metrics associated with plug-in components, generating software code modules, and enabling operational functionality of target cloud/computing components.

SUMMARY

A first aspect of the invention provides an automated system capacity optimization method comprising: retrieving, by a processor of a server hardware device from a plurality of plug-in components running on a plurality of hardware and software sources, metrics data associated with the plurality of plug-in components; cross-referencing, by the processor, the metrics data with respect to operational sizing recommendations for each plug-in component of the plurality of plug-in components based on aggregated disparate sizing guidelines; generating, by the processor, software code modules associated with results of the cross-referencing; determining, by the processor based on results of executing the software code modules, software and hardware requirements for enabling target computing components; and enabling, by the processor based on the software and hardware requirements, operational functionality of the target computing components in accordance with the software and hardware requirements.

A second aspect of the invention provides a computer program product, comprising a computer readable hardware storage device storing a computer readable program code, the computer readable program code comprising an algorithm that when executed by a processor of a server hardware device implements an automated system capacity optimization method, the method comprising: retrieving, by the processor from a plurality of plug-in components running on a plurality of hardware and software sources, metrics data associated with the plurality of plug-in components; cross-referencing, by the processor, the metrics data with respect to operational sizing recommendations for each plug-in component of the plurality of plug-in components based on aggregated disparate sizing guidelines; generating, by the processor, software code modules associated with results of the cross-referencing; determining, by the processor based on results of executing the software code modules, software and hardware requirements for enabling target computing components; and enabling, by the processor based on the software and hardware requirements, operational functionality of the target computing components in accordance with the software and hardware requirements.

A third aspect of the invention provides a server hardware device comprising a processor coupled to a computer-readable memory unit, the memory unit comprising instructions that when executed by the computer processor implements an automated system capacity optimization method comprising: retrieving, by the processor from a plurality of plug-in components running on a plurality of hardware and software sources, metrics data associated with the plurality of plug-in components; cross-referencing, by the processor, the metrics data with respect to operational sizing recommendations for each plug-in component of the plurality of plug-in components based on aggregated disparate sizing guidelines; generating, by the processor, software code modules associated with results of the cross-referencing; determining, by the processor based on results of executing the software code modules, software and hardware requirements for enabling target computing components; and enabling, by the processor based on the software and hardware requirements, operational functionality of the target computing components in accordance with the software and hardware requirements.

The present invention advantageously provides a simple method and associated system capable of automating system capacity optimization.

DETAILED DESCRIPTION

Figure 1:
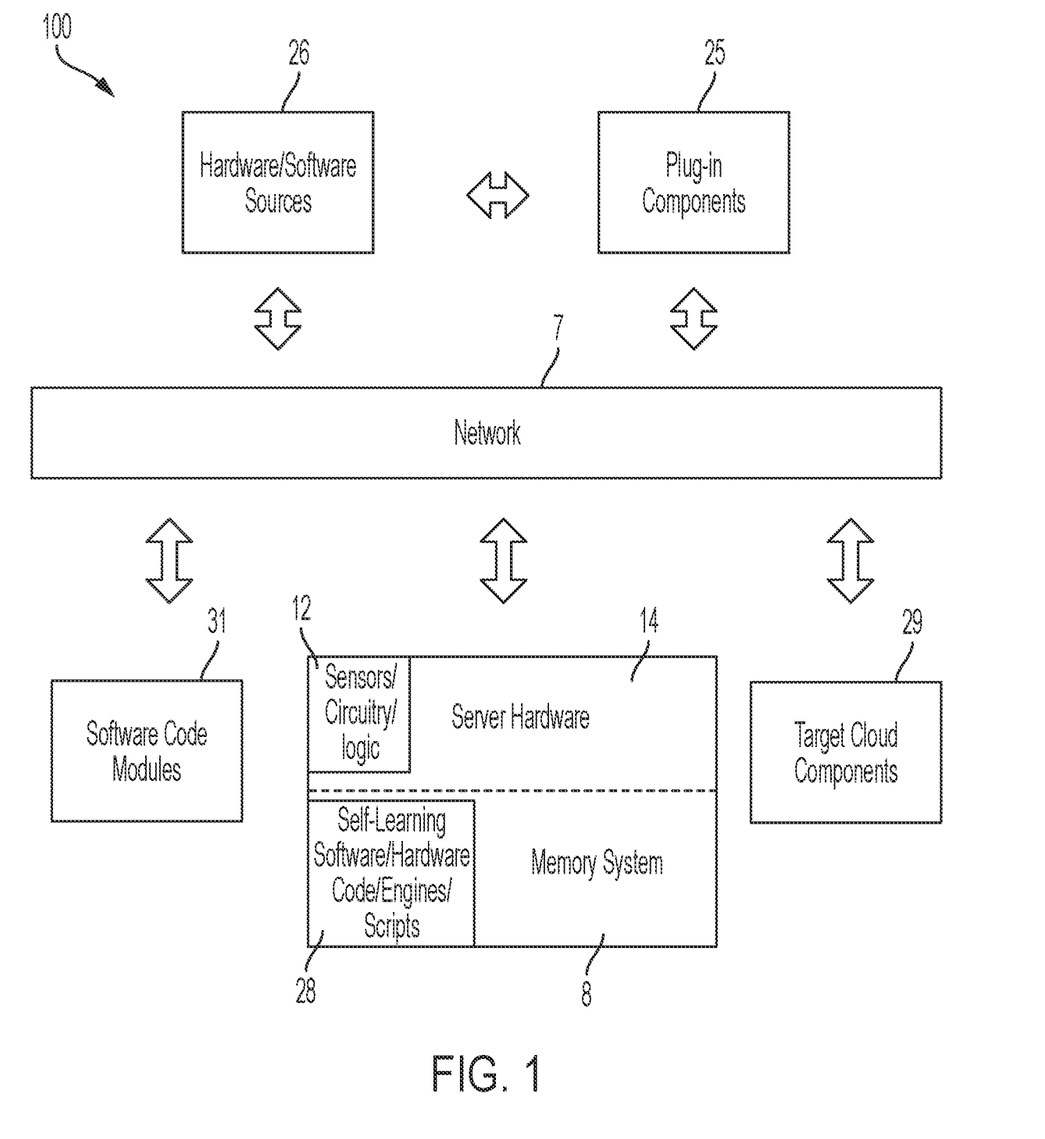
FIG. 1 illustrates a system for improving software technology associated with cross-referencing metrics associated with plug-in components, generating software code modules, and enabling operational functionality of target cloud components, in accordance with embodiments of the present invention.

FIG. 1 illustrates a system 100 for improving software technology associated with cross-referencing metrics associated with plug-in components 25, generating software code modules 31, and enabling operational functionality of target cloud (e.g., remote computing) components 29, in accordance with embodiments of the present invention. Typical hardware and software implemented cloud environments comprise manual configurations and require clients to specify a workload size (immediately) for hardware to be acquired at a future date thereby causing difficulty with respect to hardware/software requirements gathering due to difficulty with accounting for future hardware/software growth. The aforementioned manual configurations are typically implemented via a series of emails and conference calls with a client. Hardware/software requirements may change over time and an associated sizing (for components) may require future adjustment. A first typical sizing process may be implemented via retrieval (from a customer) of technical requirements with respect to a number of software licenses that may be required for a specified scenario. Likewise, a second typical sizing process may be implemented via analysis of a customer software budget with respect to infrastructure requirements and constraints needed. Therefore, system 100 is configured to automatically address the needs of required hardware and software resources within a target cloud environment. Likewise. System 100 enables: multiple on-premises metric collections, algorithms applied to a combined set of retrieved metrics, and feedback from actual implementation engagements with respect to a required size for a target cloud deployment. System 100 additionally, includes artificial intelligence (AI) code executed with respect to algorithms applied to the retrieved metrics.

System 100 comprises (expandable) plug-in (software) components 25 for execution within software environments. Plug-in (software) components 25 are configured to improve sizing estimations (with respect to hardware and software components) for target deployments. System 100 enables improvements through hardware and software expansions associated with an increasing number of metrics and algorithmic adjustments during a process for comparing estimates to actual implementation needs via hardware and software structural engagements.

System 100 may be configured to enable the following process for determining cloud infrastructure sizing:

1. Metrics (e.g., rate of logging data per application, number of applications, peak transactions per second (TPS), volume of an API call, etc.) are collected from (software) plug-in components 25 running within existing software and hardware infrastructure environments. The plug-in components 25 include respective data collection (software) scripts generated based on the existing software and hardware infrastructure environments.
2. The metrics are cross-referenced with sizing recommendations for each plug-in component based on aggregating disparate sizing guidelines.
3. Disparate sizing guidelines are retrieved and analyzed with respect to keywords to determine a logical order for the sizing guidelines and an order for running each script.
4. A logical order of the sizing guidelines are iteratively adjusted each time a new plug-in component is introduced to system 100.
5. An algorithm and associated code are generated for encompassing all sizing guidelines. The algorithm and associated code are continually modified based on correlations identified between the sizing guidelines.
6. Software and hardware needs (e.g., with respect to CPU, memory, disk space, a number of persistent volumes, etc.) are determined with respect to target cloud environments based on collected metrics and the algorithm and associated code generated.
7. The algorithm and associated code are modified based on comparing user feedback associated with determined software and hardware needs with respect to detected metrics that negatively impact an output of the algorithm and associated code.

System 100 of FIG. 1 includes server hardware 14, hardware/software sources 26, plug-in (software) components 25, software code modules 31, and target cloud components 29 interconnected through a network 7. Server hardware 14 comprises sensors/circuitry/logic 12 and a (specialized) memory system 8. Memory system 8 comprises self-learning software/hardware code/engines/scripts 28 including executable code. Memory system 8 may include a single memory system. Alternatively, memory system 8 may include a plurality of memory systems. Hardware/software sources 25 comprise source systems for executing plug-in components 25. Server hardware 14, hardware/software sources 26, and target cloud (e.g., remote computing) components 29 each may comprise an embedded device(s). An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, server hardware 14, hardware/software sources 26, and target cloud components 29 may each comprise a specialized hardware device comprising specialized (non-generic) hardware and circuitry (i.e., specialized discrete non-generic analog, digital, and logic-based circuitry) for (independently or in combination) executing a process described with respect to FIGS. 1-6. The specialized discrete non-generic analog, digital, and logic-based circuitry (e.g., sensors/circuitry/logic 12, self-learning software/hardware code/engines/scripts 28, etc.) may include proprietary specially designed components (e.g., a specialized integrated circuit, such as for example an Application Specific Integrated Circuit (ASIC) designed for only implementing an automated process for improving software technology associated with cross-referencing metrics associated with plug-in components, generating software code modules, and enabling operational functionality of target cloud components. Sensors/circuitry/logic 12 may include any type of internal or external sensors including, inter alia, GPS sensors, Bluetooth beaconing sensors, cellular telephone detection sensors, Wi-Fi positioning detection sensors, triangulation detection sensors, activity tracking sensors, a temperature sensor, an ultrasonic sensor, an optical sensor, a video retrieval device, humidity sensors, voltage sensors, network traffic sensors, etc. Network 7 may include any type of network including, inter alia, a local area network, (LAN), a wide area network (WAN), the Internet, a wireless network, etc.

System 100 is enabled to automate system capacity optimization as follows:

System 100 comprises existing software plug-ins. Each software plug-in includes scripts for every version and hardware combination. As system 100 increases in size and associated usage increases, additional knowledge and resources are required thereby impacting target system environments. System 100 is configured to be expanded via usage of additional plug-ins for every version and hardware combination. Likewise, system 100 assembles collected data from all of plug-in components for summarizing existing software and hardware infrastructure environments. System 100 will additionally run a data collection script with respect to an existing environment resulting in output generation. If system 100 is unable to automatically execute a data collection script, the script may be manually run and associated results may be uploaded. When metrics (associated with the plug-in components) are received by system 100, the metrics are cross-referenced with sizing recommendations for each plug-in component by aggregating disparate sizing guidelines that previously required manual location techniques. Likewise, system 100 searches for the disparate sizing guidelines with respect to key words to determine a logical order for the sizing guidelines and an order for running each algorithm and associated code. When each new plug-in component is retrieved, system 100 is configured to adjust an ordering of the sizing guidelines based on associated feedback generated with respect to the order for running each algorithm and associated code. System 100 is further configured to generate an algorithm and code for encompassing all sizing guidelines such that system 100 recognizes necessary correlations and creates an adjustment to the algorithm and code based on the associated feedback. Subsequently, system 100 determines software and hardware needs (e.g., CPUs, Storage, etc.) for target cloud environments based on collected data. A resulting estimation (associated with the software and hardware needs) may differ from actual system needs and therefore the algorithm and associated code may be modified for a next user. Likewise, system 100 executes machine learning code for continually improving its estimation capabilities by modifying its algorithm based on each successful use of an associated software product.

The following example illustrates an implementation scenario associated with a technical entity providing infrastructure sizing to a client for determining necessary hardware to run new software across multiple environments. The scenario is initiated when the technical entity determines the following two options for sizing the client's hardware requirements: software and licensing requirements and technical infrastructure specifications based on software needs. If the client specifies software needs and requires infrastructure specifications, system 100 may be accessed via client login credentials for execution of an associated software tool. In response, information associated with target cloud environments and target cloud software data of the client is retrieved and the following information is presented (via a graphical user interface) to the client:

1. Existing software and associated version with respect to a size for a necessary infrastructure.
2. The target environments associated with size requirements for the existing software.
3. A script associated with an associated software version on existing hardware.
4. Administrative endpoint code generated based on credentials for running the script.

When system 100 has automatically run all necessary scripts, associated data is uploaded into a project folder. Subsequently, automated check boxes are presented adjacent to associated data collection points that have been successfully uploaded to the project folder. The technical entity and client are able to view an audit trail associated with a time period within the sizing process. Subsequently, 3 differing algorithms and associated code are executed for providing the infrastructure sizing for determining necessary hardware to run new software across multiple environments.

A first algorithm is associated with retrieval of application workload level metrics for comparison of sizing guidelines. Executing the first algorithm enables a process for retrieving application level workload metrics (e.g., a rate of logging data per application, a number of applications, peak TPS, a volume of API calls, an availability of an application workload, etc.). A resulting output comprises information associated with CPU, memory, disk space and persistent volumes required for providing the infrastructure sizing associated with worker nodes. For example, an output may include a sizing for an application programming interface platform, message queuing middleware, and application connectivity software. The first algorithm is run for each workload needed within an associated hardware/software cluster.

A second algorithm is configured to retrieve results from the first algorithm for comparison to a next dependent iteration of sizing guidelines. For example, results (a determined e.g., a number of worker nodes) are retrieved from the first algorithm and additional capacity requirements are compared to master node sizing guidelines. A resulting output comprises CPU and memory, disk space and persistent volume requirements needed for the master nodes. For example, the first algorithm output specified that six worker nodes are needed and therefore three master nodes (comprising CPU, memory, disk space, and persistent volumes) are recommended with respect to a predicted additional capacity required.

A third algorithm is configured to retrieve results from the first algorithm and second algorithm for comparison to a next dependent iteration of the sizing guidelines. Master node and worker node sizing recommendations and inputted into the third algorithm for optimizing a configuration for creating alternative smaller configurations. For example, if a proof of concept is required with respect to an unsupported configuration information associated with CPU, memory, disk space, and persistent volume requirements may be analyzed for determining recommendations that are not comprised by a plug-in and are associated with a target environment. A resulting output (from the three algorithms) may be analyzed for providing system feedback with respect to results. Based on user input feedback, system 100 is configured to query inputs to the algorithms to locate a metric determined to be associated with the algorithms. The metric is additionally determined to impact the results. The metric is compared to the user feedback to determine metric differences impacting system 100. Subsequently, system 100 may adjust and improve additional results during each subsequent loop. Additionally, the client may be required to supply estimated growth projections for associated metrics retrieved from scripts and sizing requirements for growth projections may be submitted. Therefore, system 100 is configured to generate various projections of infrastructure requirements by comparing sizing based on a current workload with aggregated sizing guidelines to illustrate what a next size up would reflect with respect to metrics such as CPU requirements, memory requirements, disk space requirements, and storage (persistent volumes) requirements. Projections needed for growth over a period of 3 months, 6 months, 12 months, and 24 months may be presented to the client. The projections may enable clients to determine infrastructure requirements effectively to better understand associated software workload growth overtime thereby allowing the client to budget associated attributes for increasing a speed of development and time to market.

Figure 2:
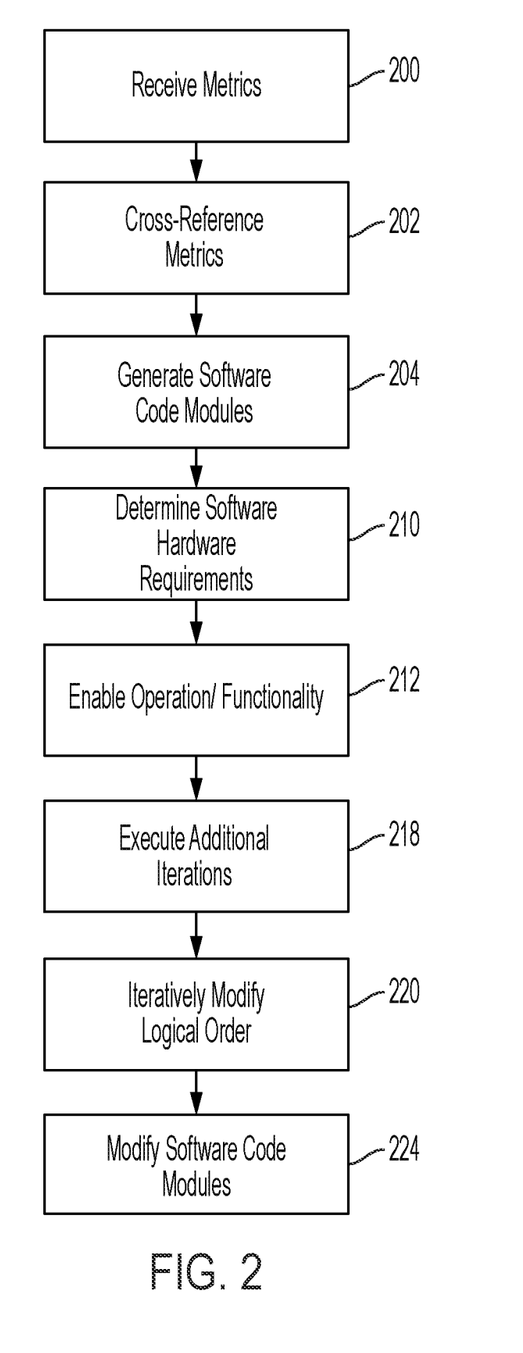
FIG. 2 illustrates an algorithm detailing a process flow enabled by the system of FIG. 1 for improving software technology associated with cross-referencing metrics associated with plug-in components, generating software code modules, and enabling operational functionality of target cloud components, in accordance with embodiments of the present invention.

FIG. 2 illustrates an algorithm detailing a process flow enabled by system 100 of FIG. 1 for improving software technology associated with cross-referencing metrics associated with plug-in components, generating software code modules, and enabling operational functionality of target cloud components, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed in combination by server hardware 14, hardware/software sources 26, and target cloud components 29 of FIG. 1. In step 200, metrics data associated with plug-in components running on hardware and software sources are retrieved from the plug-in components. Additionally, a software script may be executed such that retrieving the metrics data is executed in response to executing the software script. The metrics data may include, inter alia, a data logging rate for each software application associated with the plug-in components, a number of software applications associated with the plug-in components, peak TPS transactions for software applications associated with the plug-in components, a volume of API calls for software applications associated with the plug-in components, availability requirements associated with the plug-in components, etc.

In step 202, the metrics data are cross-referenced with respect to operational sizing recommendations for each plug-in component based on aggregated disparate sizing guidelines. In step 204, software code modules associated with results of the cross-referencing process of step 202 are generated. In step 210, software and hardware requirements for enabling target cloud components are determined based on results of executing software code modules. Additionally, a search with respect to the aggregated disparate sizing guidelines may be executed and in response, a logical order for executing the software code modules may be generated.

In step 212, operational functionality of the target cloud components is enabled in accordance with the software and hardware requirements. The software and hardware requirements may include CPU requirements, storage requirements, memory requirements, disk space requirements, and persistent volume requirements for enabling the target cloud components.

In step 218, additional iterations of the aforementioned process may be executed and successful operational functionality of the target cloud components may be determined and the software code modules may be modified. In step 220, the logical order for executing the software code modules is iteratively modified. The logical order may be modified in response to receiving additional software code modules. Alternatively, the logical order may be modified in response to determining successful operational functionality of the target cloud components. In step 224, the software code modules are modified with respect to determining successful operation with respect to the additional software code modules.

Figure 3:
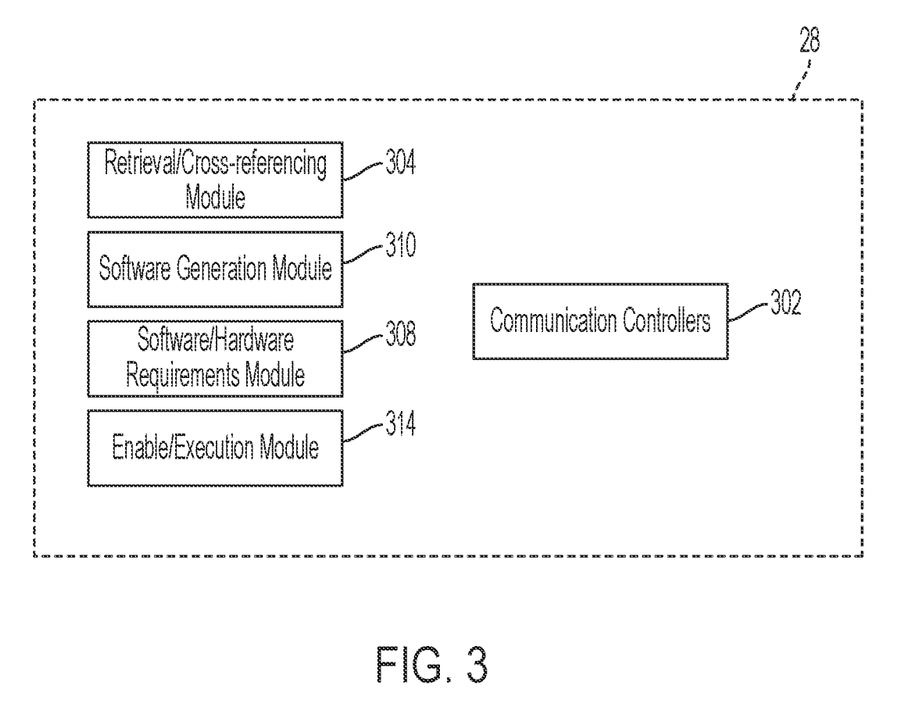
FIG. 3 illustrates an internal structural view of the self-learning software/hardware code/engine of FIG. 1, in accordance with embodiments of the present invention.

FIG. 3 illustrates an internal structural view of self-learning software/hardware code engines 28 of FIG. 1, in accordance with embodiments of the present invention. Self-learning software/hardware code/engines/scripts 28 includes a retrieval/cross-referencing module 304, a software generation module 310, a software/hardware requirements module 308, an enable/execution module 314, and communication controllers 302. Retrieval/cross-referencing module 304 comprises specialized hardware and software for controlling all functions related to the retrieval and cross-referencing steps described with respect to the algorithm of FIG. 2. Software generation module 310 comprises specialized hardware and software for controlling all functionality related to the software generation steps described with respect to the algorithm of FIG. 2. Software/hardware requirements module 308 comprises specialized hardware and software for controlling all functions related to generating software and hardware requirements with respect to the algorithm of FIG. 2. Enable/execution module 314 comprises specialized hardware and software for controlling all functions related to the enabling and execution steps of the algorithm of FIG. 2. Communication controllers 302 are enabled for controlling all communications between retrieval/cross-referencing module 304, software generation module 310, software/hardware requirements module 308, and enable/execution module 314.

Figure 4:
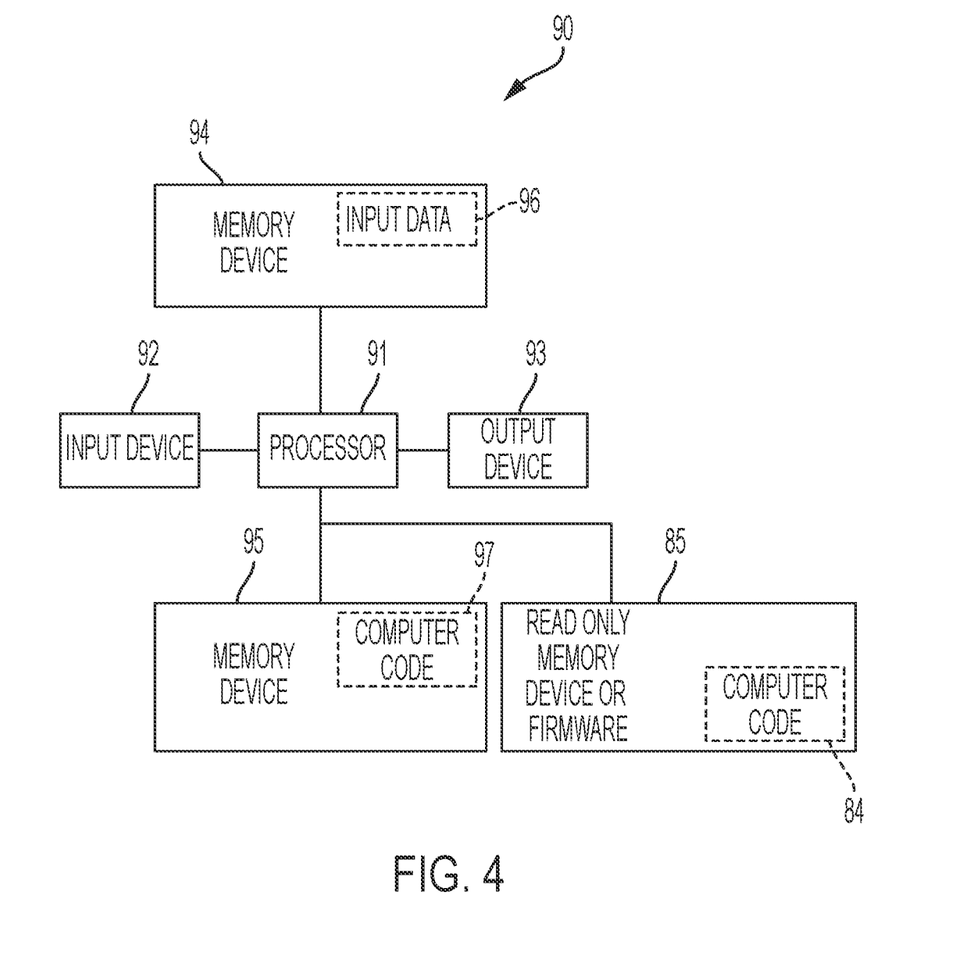
FIG. 4 illustrates a computer system used by the system of FIG. 1 for improving software technology associated with cross-referencing metrics associated with plug-in components, generating software code modules, and enabling operational functionality of target cloud components, in accordance with embodiments of the present invention.

FIG. 4 illustrates a computer system 90 (e.g., server hardware 14, hardware/software sources 26, and target cloud components 29 of FIG. 1) used by or comprised by the system 100 of FIG. 1 for improving software technology associated with cross-referencing metrics associated with plug-in components, generating software code modules, and enabling operational functionality of target cloud components, in accordance with embodiments of the present invention.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, spark, R language, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 4 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 2) for improving software technology associated with cross-referencing metrics associated with plug-in components, generating software code modules, and enabling operational functionality of target cloud components. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include algorithms (e.g., the algorithm of FIG. 2) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve software technology associated with cross-referencing metrics associated with plug-in components, generating software code modules, and enabling operational functionality of target cloud components. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving software technology associated with cross-referencing metrics associated with plug-in components, generating software code modules, and enabling operational functionality of target cloud components. In another embodiment, the invention provides a business method that performs the process steps of the invention on a subscription, advertising, and/or fee basis. That is, a service supplier, such as a Solution Integrator, could offer to enable a process for improving software technology associated with cross-referencing metrics associated with plug-in components, generating software code modules, and enabling operational functionality of target cloud components. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
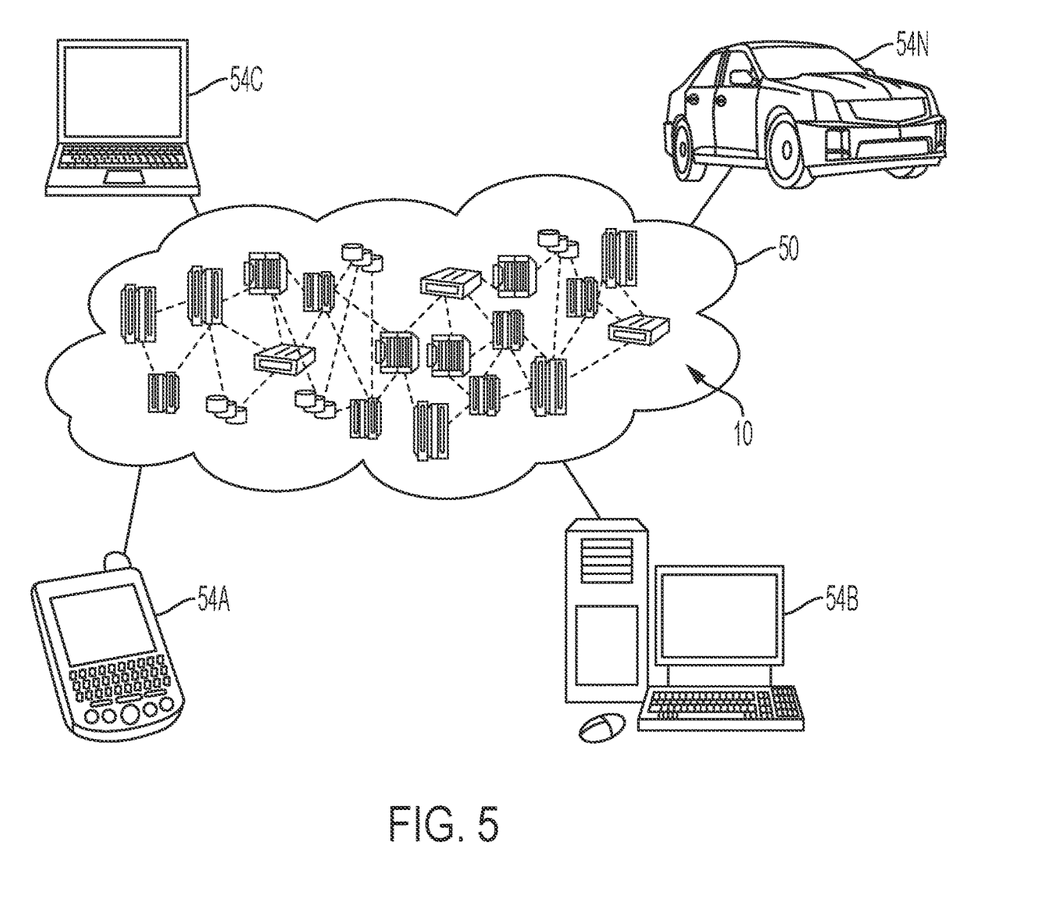
FIG. 5 illustrates a cloud computing environment, in accordance with embodiments of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 5 are intended to be illustrative only and that computing nodes 10 and cloud computing environment 50 can communicate with any type of computerized device over any type of network and/or network addressable connection (e.g., using a web browser).

Figure 6:
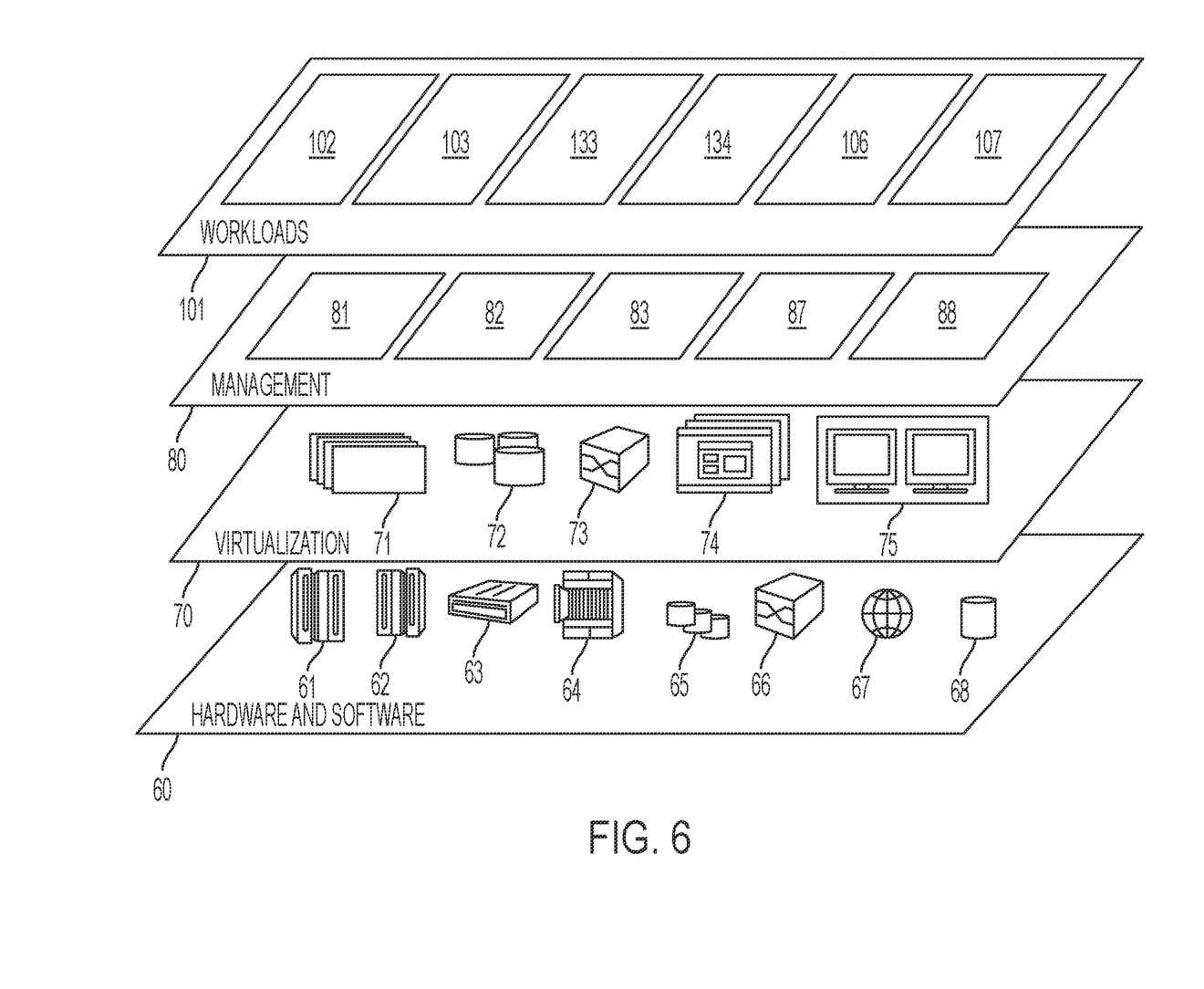
FIG. 6 illustrates a set of functional abstraction layers provided by cloud computing environment, in accordance with embodiments of the present invention.

Referring now to FIG. 6, a set of functional abstraction layers provided by cloud computing environment 50 (see FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 87 provides cloud computing resource allocation and management such that required service levels are met. Service Level Agreement (SLA) planning and fulfillment 88 provide pre-arrangement for, and procurement of, cloud computing resources for which a future requirement is anticipated in accordance with an SLA.

Workloads layer 101 provides examples of functionality for which the cloud computing environment may be utilized. Examples of workloads and functions which may be provided from this layer include mapping and navigation 102; software development and lifecycle management 103; virtual classroom education delivery 133; data analytics processing 134; transaction processing 106; and for improving software technology associated with cross-referencing metrics associated with plug-in components, generating software code modules, and enabling operational functionality of target cloud components 107.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. An automated system capacity optimization method comprising:
retrieving, by a processor of a server hardware device from a plurality of plug-in components running on a plurality of hardware and software sources, metrics data associated with said plurality of plug-in components;
cross-referencing, by said processor, said metrics data with respect to operational sizing recommendations for each plug-in component of said plurality of plug-in components based on aggregated disparate sizing guidelines;
generating, by said processor, software code modules associated with results of said cross-referencing;
determining, by said processor based on results of executing said software code modules, software and hardware requirements for enabling target computing components; and
enabling, by said processor based on said software and hardware requirements, operational functionality of said target computing components in accordance with said software and hardware requirements.

2. The method of claim 1, further comprising:
executing, by said processor, a software script, wherein said retrieving said metrics data is executed in response to said executing said software script.

3. The method of claim 1, further comprising:
executing, by said processor, a search with respect to said aggregated disparate sizing guidelines; and
generating, by said processor based on results of said executing said search, a logical order for said executing said software code modules.

4. The method of claim 3, further comprising:
executing, by said processor, additional iterations of said automated system capacity optimization method;
determining, by said processor based on results of said executing said additional iterations, successful operation of said target computing components; and
modifying, by said processor, said software code modules with respect to said determining said successful operation with respect to additional software code modules.

5. The method of claim 4, further comprising:
iteratively modifying, by said processor, said logical order in response to receiving said additional software code modules.

6. The method of claim 4, further comprising:
iteratively modifying, by said processor, said logical order in response to said determining said successful operation.

7. The method of claim 1, wherein said metrics data comprises data selected from the group consisting of a data logging rate for each software application associated with said plurality of plug-in components, a number of software applications associated with said plurality of plug-in components, peak TPS transactions for software applications associated with said plurality of plug-in components, a volume of API calls for software applications associated with said plurality of plug-in components, and availability requirements associated with said plurality of plug-in components.

8. The method of claim 1, wherein said software and hardware requirements comprise CPU requirements, storage requirements, memory requirements, disk space requirements, and persistent volume requirements for enabling said target computing components.

9. The method of claim 1, further comprising:
providing at least one support service for at least one of creating, integrating, hosting, maintaining, and deploying computer-readable code in the server hardware device, said code being executed by the computer processor to implement: said retrieving, said cross-referencing, said generating, said determining, and said enabling.

10. A computer program product, comprising a computer readable hardware storage device storing a computer readable program code, said computer readable program code comprising an algorithm that when executed by a processor of a server hardware device implements an automated system capacity optimization method, said method comprising:
retrieving, by said processor from a plurality of plug-in components running on a plurality of hardware and software sources, metrics data associated with said plurality of plug-in components;
cross-referencing, by said processor, said metrics data with respect to operational sizing recommendations for each plug-in component of said plurality of plug-in components based on aggregated disparate sizing guidelines;
generating, by said processor, software code modules associated with results of said cross-referencing;
determining, by said processor based on results of executing said software code modules, software and hardware requirements for enabling target computing components; and
enabling, by said processor based on said software and hardware requirements, operational functionality of said target computing components in accordance with said software and hardware requirements.

11. The computer program product of claim 10, wherein said method further comprises:
executing, by said processor, a software script, wherein said retrieving said metrics data is executed in response to said executing said software script.

12. The computer program product of claim 10, wherein said method further comprises:
executing, by said processor, a search with respect to said aggregated disparate sizing guidelines; and
generating, by said processor based on results of said executing said search, a logical order for said executing said software code modules.

13. The computer program product of claim 12, wherein said method further comprises:
executing, by said processor, additional iterations of said automated system capacity optimization method;
determining, by said processor based on results of said executing said additional iterations, successful operation of said target computing components; and
modifying, by said processor, said software code modules with respect to said determining said successful operation with respect to additional software code modules.

14. The computer program product of claim 13, wherein said method further comprises:
iteratively modifying, by said processor, said logical order in response to receiving said additional software code modules.

15. The computer program product of claim 13, wherein said method further comprises:
iteratively modifying, by said processor, said logical order in response to said determining said successful operation.

16. The computer program product of claim 10, wherein said metrics data comprises data selected from the group consisting of a data logging rate for each software application associated with said plurality of plug-in components, a number of software applications associated with said plurality of plug-in components, peak TPS transactions for software applications associated with said plurality of plug-in components, a volume of API calls for software applications associated with said plurality of plug-in components, and availability requirements associated with said plurality of plug-in components.

17. The computer program product of claim 10, wherein said software and hardware requirements comprise CPU requirements, storage requirements, memory requirements, disk space requirements, and persistent volume requirements for enabling said target computing components.

18. A server hardware device comprising a processor coupled to a computer-readable memory unit, said memory unit comprising instructions that when executed by the computer processor implements an automated system capacity optimization method comprising:
retrieving, by said processor from a plurality of plug-in components running on a plurality of hardware and software sources, metrics data associated with said plurality of plug-in components;
cross-referencing, by said processor, said metrics data with respect to operational sizing recommendations for each plug-in component of said plurality of plug-in components based on aggregated disparate sizing guidelines;
generating, by said processor, software code modules associated with results of said cross-referencing;
determining, by said processor based on results of executing said software code modules, software and hardware requirements for enabling target computing components; and
enabling, by said processor based on said software and hardware requirements, operational functionality of said target computing components in accordance with said software and hardware requirements.

19. The server hardware device of claim 18, wherein said method further comprises:
executing, by said processor, a software script, wherein said retrieving said metrics data is executed in response to said executing said software script.

20. The server hardware device of claim 18, wherein said method further comprises:
executing, by said processor, a search with respect to said aggregated disparate sizing guidelines; and
generating, by said processor based on results of said executing said search, a logical order for said executing said software code modules.

* * * * *